United States Patent
Shaffer et al.

(10) Patent No.: US 6,728,221 B1
(45) Date of Patent: Apr. 27, 2004

(54) METHOD AND APPARATUS FOR EFFICIENTLY UTILIZING CONFERENCE BRIDGE CAPACITY

(75) Inventors: Shmuel Shaffer, Palo Alto, CA (US); William J. Beyda, Cupertino, CA (US)

(73) Assignee: Siemens Information & Communication Networks, Inc., Boca Raton, FL (US)

(*) Notice: Subject to any disclaimer, the term of this patent is extended or adjusted under 35 U.S.C. 154(b) by 0 days.

(21) Appl. No.: 09/289,547

(22) Filed: Apr. 9, 1999

(51) Int. Cl.[7] .................................................. H04L 12/16
(52) U.S. Cl. ............................................................. 370/260
(58) Field of Search ............................... 370/260, 264, 370/268, 269, 270, 352

(56) References Cited

U.S. PATENT DOCUMENTS

| | | | | |
|---|---|---|---|---|
| 4,360,827 A | * | 11/1982 | Braun ....................... 348/14.09 |
| 4,878,242 A | * | 10/1989 | Springer et al. ............. 358/434 |
| 4,937,856 A | * | 6/1990 | Natarajan ................... 370/260 |
| 4,998,243 A | * | 3/1991 | Kao ............................. 370/264 |
| 5,317,567 A | * | 5/1994 | Champion ................... 370/267 |
| 5,436,846 A | * | 7/1995 | Fleming-Dahl ............. 324/638 |
| 5,436,896 A | * | 7/1995 | Anderson et al. ........... 370/260 |
| 5,473,363 A | | 12/1995 | Ng et al. |
| 5,495,522 A | | 2/1996 | Allen et al. |
| 5,546,449 A | * | 8/1996 | Hogan et al. ................ 379/158 |
| 5,617,539 A | * | 4/1997 | Ludwig et al. .............. 345/753 |
| 5,689,641 A | * | 11/1997 | Ludwig et al. ............. 348/14.08 |
| 5,724,416 A | * | 3/1998 | Foladare et al. ............. 370/260 |
| 5,741,338 A | * | 4/1998 | Singleton ........................ 8/606 |
| 5,751,338 A | * | 5/1998 | Ludwig, Jr. .................. 345/2.2 |
| 5,768,263 A | | 6/1998 | Tischler et al. |
| 5,818,836 A | * | 10/1998 | DuVal .......................... 370/352 |
| 5,841,763 A | | 11/1998 | Leondires et al. |
| 5,867,654 A | * | 2/1999 | Ludwig et al. .............. 345/753 |
| 5,920,565 A | * | 7/1999 | Cullen .......................... 370/401 |

FOREIGN PATENT DOCUMENTS

GB            2 312 810 A        11/1997

* cited by examiner

*Primary Examiner*—Wellington Chin
*Assistant Examiner*—William Schultz

(57) ABSTRACT

Methods, apparatus and computer system for efficiently utilizing a conference bridge capacity in order to support a multipoint conference call are described. Each conference bridge within multiple communication groups determines which local communication unit is a dominant local communication unit, quantizes that dominant local communication unit's signal, and transmits the quantized signal of the dominant local communication unit via signaling channels to the other conference bridges. Each conference bridge then compares the various quantized signals of the various dominant local communication units to determine an overall dominant communication unit of the multipoint conference. Then the signal of the overall dominant communication unit is then transmitted to all communication units participating in the conference call in various ways for different embodiments of the invention.

22 Claims, 7 Drawing Sheets

METHOD AND APPARATUS FOR EFFICIENTLY UTILIZING CONFERENCE BRIDGE CAPACITY

BACKGROUND OF THE INVENTION

The invention generally relates to the fields of computer systems and computer conferencing. More particularly, the invention is directed to methods and apparatus for efficiently utilizing multipoint conference bridge capacity.

Telephone conferencing systems have been available for many years. These systems have primarily focused on providing audio conferencing. A typical conference includes a group of individuals who are telephonically connected into a discussion by an operator at a central locality. In recent years, however, the addition of video capabilities as well as the use of multimedia applications has greatly increased the bandwidth required to establish a multipoint audio-video conference. Multimedia applications typically involve different application types such as control data, video, images, and audio, which are exchanged between the various participants in the multipoint videoconference.

A multipoint conference bridge (also known as a multipoint control unit, or MCU) is a logically centralized service that performs data combination and conference management, such as adding and dropping clients. The multipoint conference bridge has multiple physical ports, each of which can support a logical connection to a client to the conference. Each port of the bridge represents a certain amount of available digital signal processing (DSP) power in the conferencing fabric of the bridge. In the present discussion, only the audio portion of the conference is discussed for simplicity. Typically, the multipoint conference bridge accepts audio signals from each of the clients via respective logical connections, selects a signal to output (e.g., the strongest signal received from the clients) to all clients, and transmits this signal, thereby enabling multipoint communication.

However, a multipoint conference bridge always has a limited capacity. That is, a multipoint conference bridge may have four ports, which is sufficient only to support four conferees. A conventional approach used to increase the conference capacity is referred to as "chaining." In chaining, multiple conference bridges are interconnected in order to increase the overall number of ports available to meet either anticipated or actual demand. As shown in FIG. 1A, two four-port multipoint conference bridges are shown chained together to increase the number of conferees able to participate in the conference to six. In particular, FIG. 1A shows a first four-port multipoint conference bridge 102 interconnected to a second four-port multipoint conference bridge 104 in support of a multipoint conference between six conferees (A, B, C, D, E, and F) that are logically connected to remaining ports of the bridges. Although the clients are shown connected to the ports of the bridges via direct lines, it should be noted that these direct lines indicate the logical connections, rather than the physical connections. Physically, the clients and bridges may each be connected to a network over which the logical connections are made as shown in FIG. 1A. This will also apply for FIG. 1B. Conventionally, this bridge-to-bridge interconnection is accomplished by connecting together one port from each conference bridge 102 and 104. By connecting the ports 102-4 and 104-1 for the dedicated bridge-to-bridge connection, the necessary number of ports is thus made available to connect the six conferees. Each multipoint conference bridge accepts audio signals from each of the clients connected via its logical connections. Each bridge then determines, e.g., the strongest signal received from its connected clients. Each bridge's strongest signal is exchanged to the other bridge over ports 102-4 and 104-1. Each bridge selects the strongest of its strongest signal and the other bridge's strongest signal to then be output to all clients. However, the total number of available ports for the two bridges is now reduced from a total of eight to six (a reduction of 25%), in order to provide for the shared multipoint conference having six conferees.

FIG. 1B illustrates the situation where an additional conferee G wishes to join the conference call with the conferees (A, B, C, D, E, and F). In order to accommodate the seventh conferee G, a third conference bridge 106 must be interconnected to the conference bridges 102 and 104. Since one additional port from bridge 104 must now be used to connect the bridge 104 to the bridge 106, one of the conferees coupled to bridge 104 must now be logically reconnected to the bridge 106. By way of example, the bridge 106 is connected to the bridge 104 by coupling the ports 106-1 and 104-4. However, the conferee F that was coupled to the port 104-4 must now be moved to the port 106-2. Even though chaining the conference bridges 102, 104, and 106 as shown in FIG. 1B provides the necessary number of increased ports to support the desired conference call, at least one port from each of conference bridges must be used to provide this bridge interconnection. This arrangement substantially reduces the number of ports from a maximum of 12 ports between three four-port bridges to only a maximum of 8 ports, a reduction of 33%.

Therefore, the user investment in providing multiple conference bridges for larger conferences is wasted to the extent that the dedicated bridge-to-bridge connection of ports results in the reduction of available ports for the conference clients. In addition to being expensive, additional conference bridges also increase the complexity of interconnects between the various bridges and any network, such as a LAN, to which the bridges are coupled.

Therefore, an improved method and apparatus for efficiently interconnecting multimedia conference bridges for a conference call are desirable.

SUMMARY OF THE INVENTION

Broadly speaking, the invention relates to an improved method, apparatus and computer system for reducing the number of interconnections between multimedia conference bridges in support of a multipoint conference. The multipoint conference is established by each multimedia conference bridge participating in the conference call determining which of its local clients is a local dominant client. In a preferred embodiment, audio signals are processed in such a way that resource intensive digital signal processing is not required to be performed. A global dominant client is then determined based upon a comparison of quantized values of all local dominant client's signals against each other. The signal of the global dominant client is then transmitted, in either a multicast or unicast mode, to all clients participating in the conference call.

Various specific embodiments and other advantages of the present invention will discussed in further detail in the following detailed description in conjunction with the following drawings.

DETAILED DESCRIPTION OF THE EMBODIMENTS

Figure 1A:
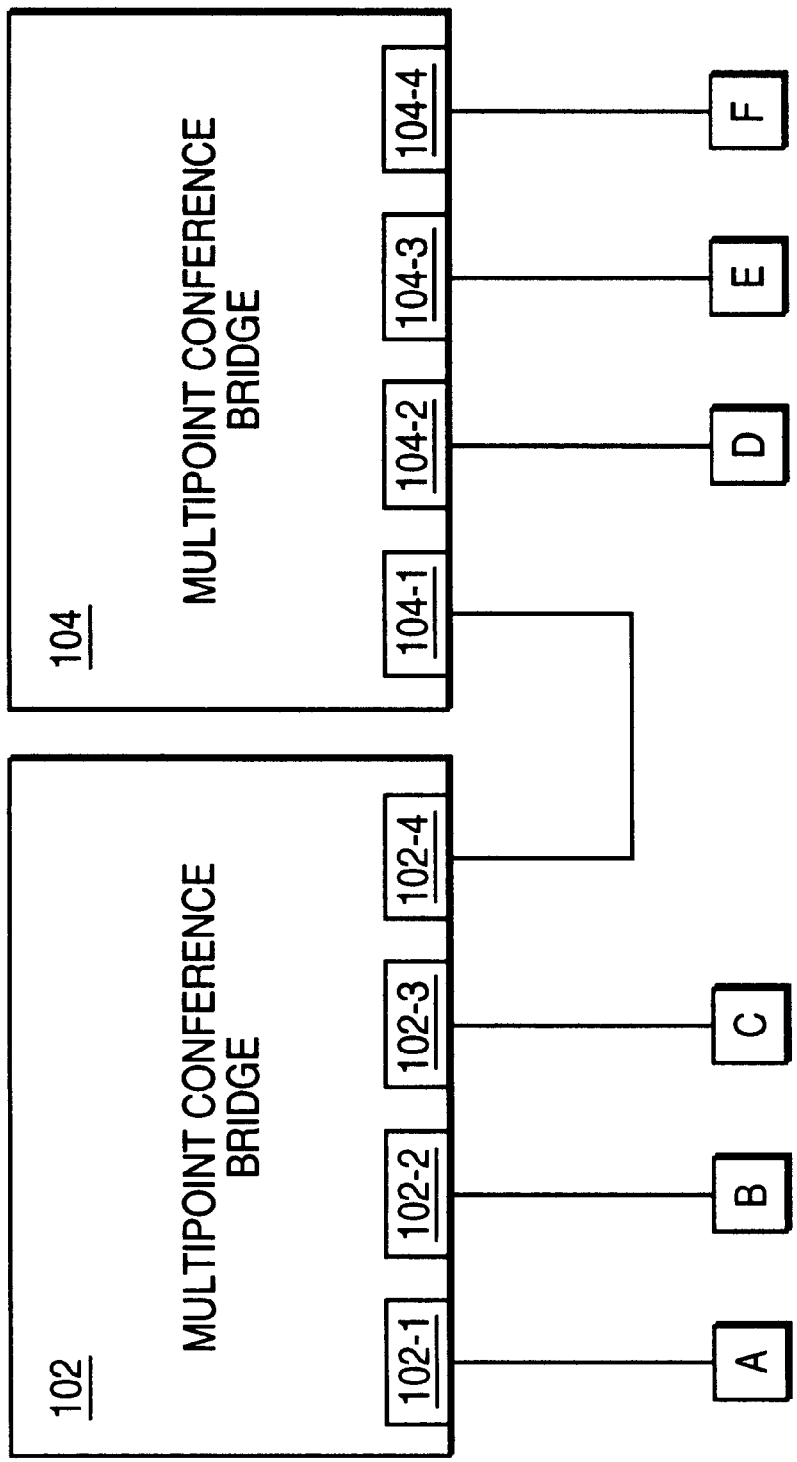
FIG. 1A illustrates a conventional approach to interconnecting multipoint conference bridges in support of a conference call.

This invention is generally directed to a system for performing multipoint conferencing. More particularly, the number of multimedia conference bridges required to carry out a multipoint conference is reduced, since each conference bridge does not dedicate a port for the bridge-to-bridge interconnection for transmission of audio streams according to the conventional approach. Again, this description of the specific embodiment of the present invention is in the context of audio streams in an audio conference for simplicity, but the description will generally apply to video, audio-video, multimedia and other conferencing systems. The present invention provides for a signaling channel rather than a dedicated audio channel between the conference bridges. This signaling channel is used to send signaling information (further described below) between the bridges, but does not consume very much DSP resources in the conference ports. According to the present invention, each conference bridge receives the audio signals from the clients logically connected to it, and then determines its own local dominant client. Each conference bridge then quantizes its local dominant client's audio signal and sends this quantized information in a new protocol element via the signaling channel to all other (non-local) conference bridges. Upon receiving the protocol elements with this information from the other conference bridges, each conference bridge determines which of the local dominant clients is the overall dominant client. After the determination of the overall dominant client is made, the bridge that is logically connected to the overall dominant client instructs that overall dominant client to send its signal either as a unicast or multicast signal to all the other clients, according to embodiments having clients with this ability. Of course, each conference bridge continually samples the signals from its local clients to determine if any one of them has "taken over" the presentation and therefore has become the dominant local client. That is, the determination procedures are repeated until it is determined that there is a new overall dominant client. If there is a new overall dominant client, the new overall dominant client is instructed to send its signal out to the other clients and the old overall dominant client is instructed to stop sending its signal. In other embodiments having clients without this ability to send signals directly to other clients, the bridge that is logically connected to the overall dominant client broadcasts the overall dominant client's signal to all conference bridges which then transmit this signal to its local clients.

The present invention therefore minimizes the DSP resources required for the conference bridge and maximizes the utilization of conference bridge ports available for logical connection to clients.

The invention will now be described in more detail in the context of an audio multipoint conferencing system over a telephony-over-LAN (ToL) system; however, it should be noted that the invention can be used for other types of conferencing systems. Such other systems include audio-video conferencing systems, multimedia conferencing systems, wireless conferencing systems, and the like.

Figure 2:
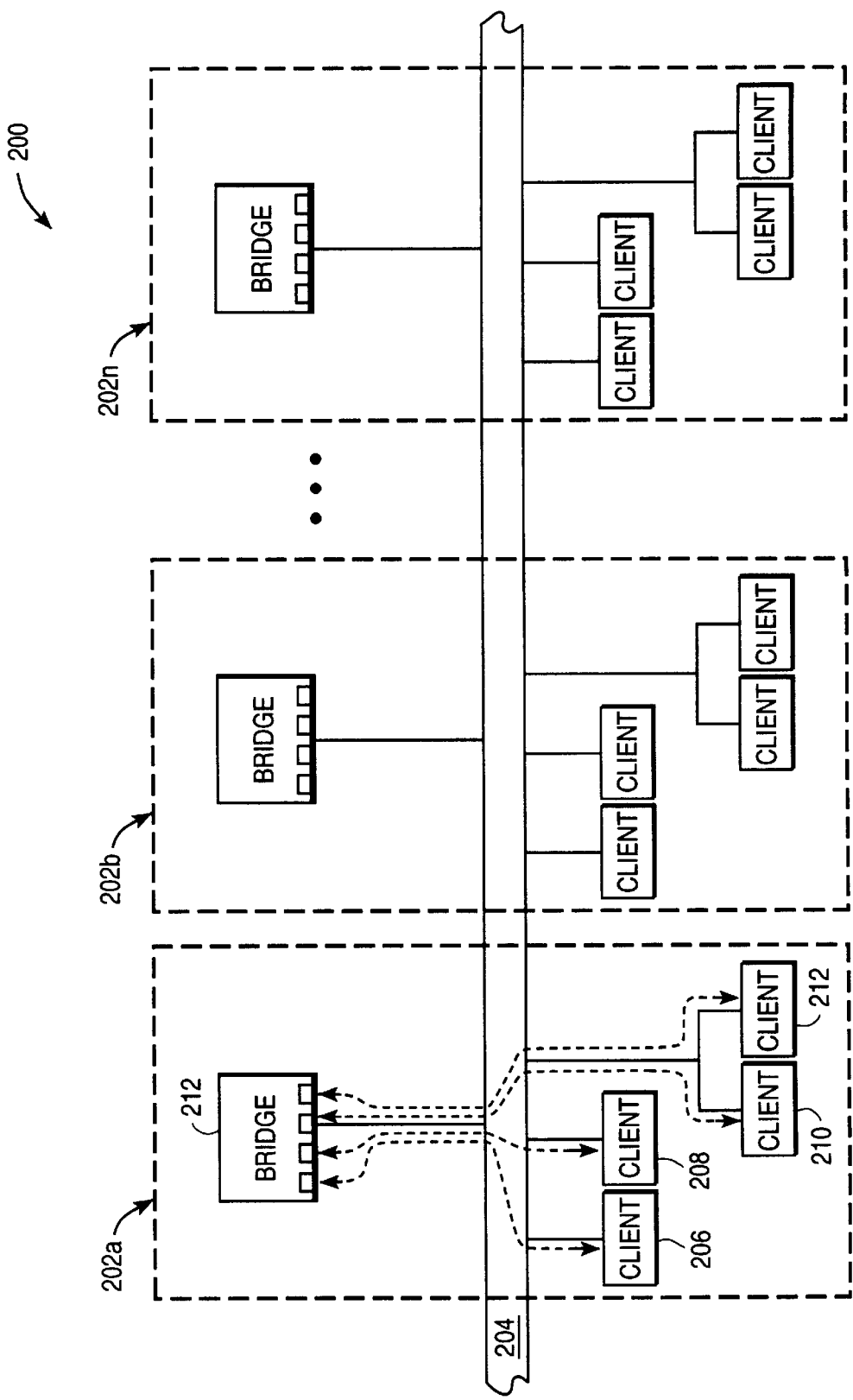
FIG. 2 illustrates one approach to interconnecting at least a first four-port bridge and a second four-port bridge in accordance with an embodiment of the invention.

FIG. 2 illustrates a schematic block diagram of a telephony-over-LAN (ToL) system 200 that includes conference bridges of the type employed with a specific embodiment of the invention. The ToL system 200 includes a plurality of logical communication groups (shown in dotted line boxes) 202a through 202n connected to a network 204. Each of the groups 202a–202n includes a corresponding group of clients that are logically connected via network 204 to an associated conference bridge (in this example, a four-port bridge is assumed). This arrangement permits any client in any group to participate in a conference call with any other client in any other group connected to the network 204. By way of example, the group 202a includes clients 206, 208, 210 and 212, each of which interacts with a conference bridge 212 that is coupled to the network 204. Each of these clients has a logical connection (dotted line arrows show these logical connections) to a port of four-port bridge 212. Each of the clients 206–210 interacts with the conference bridge 212 using their respective terminals (not shown) typically via a graphical user (client) interface (GUI). Terminals can take many forms, including personal computers (PCs) and set-top boxes, and are equipped with broadband network access as well as input/output (I/O) devices such as displays, microphones, and/or cameras. Application software running on the terminal or its agent (e.g., a PC controlling access to a telephone) uses a signaling process such as remote procedure call (RPC) to interact with the bridge service.

Figure 1B:
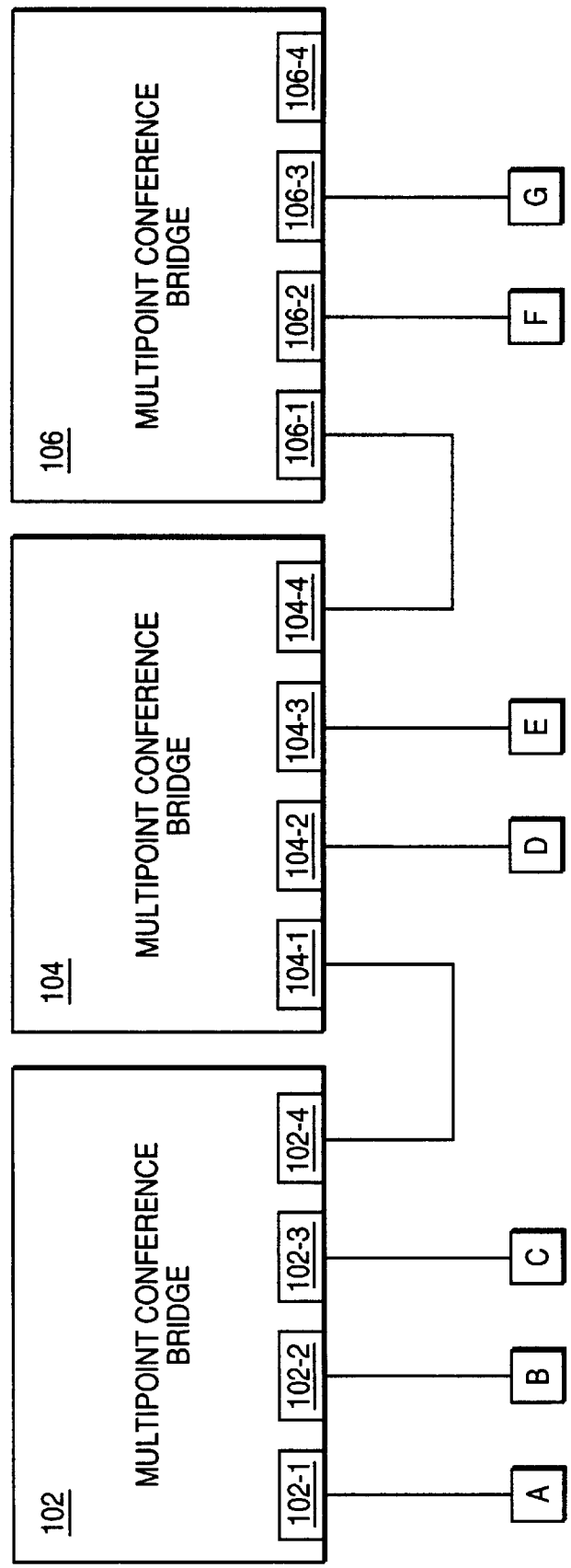
FIG. 1B illustrates the conventional arrangement of FIG. 1A where an additional conferee is added to the conference call.
Figure 4:
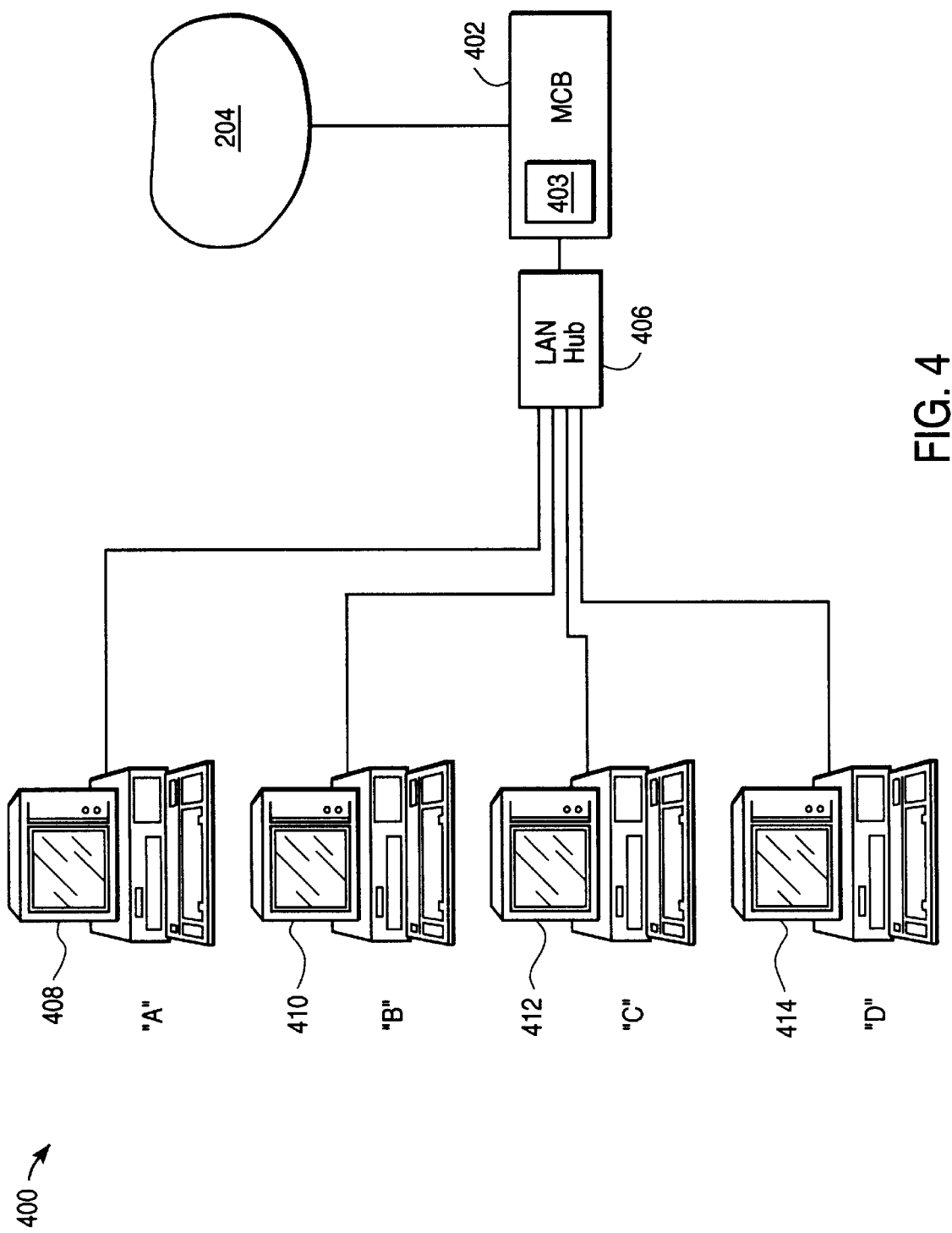
FIG. 4 is a schematic block diagram of an example of a communication group in accordance with another specific embodiment.

The bridge service is software running on the conference bridge 212 to implement the application programmer's interface (API) to the services provided by the bridge 212. In the described embodiment, the bridge 212 is designed to allow simultaneous access by any of the clients 206–210 logically connected to bridge 212 via the ports of bridge 212 over network 204. Physically, the clients and bridges may each be connected to network 204 over which the logical connections are made as shown in FIG. 2. Alternatively in other embodiments, the clients in each logical communication group may be directly connected to a port of the bridge in the group (somewhat similar to configurations shown in FIGS. 1A and 1B); or in each logical communication group, clients may be logically connected via a LAN hub to a bridge that is then connected to network 204, as shown in FIG. 4. A broadband network is used to transport control information, such as signaling, and data traffic over virtual circuits between the bridge 212 and the clients/terminals. Data traffic includes continuous media such as audio and video, which can be used depending on particular application requirements, client preferences, and terminal capabilities.

Figure 3:
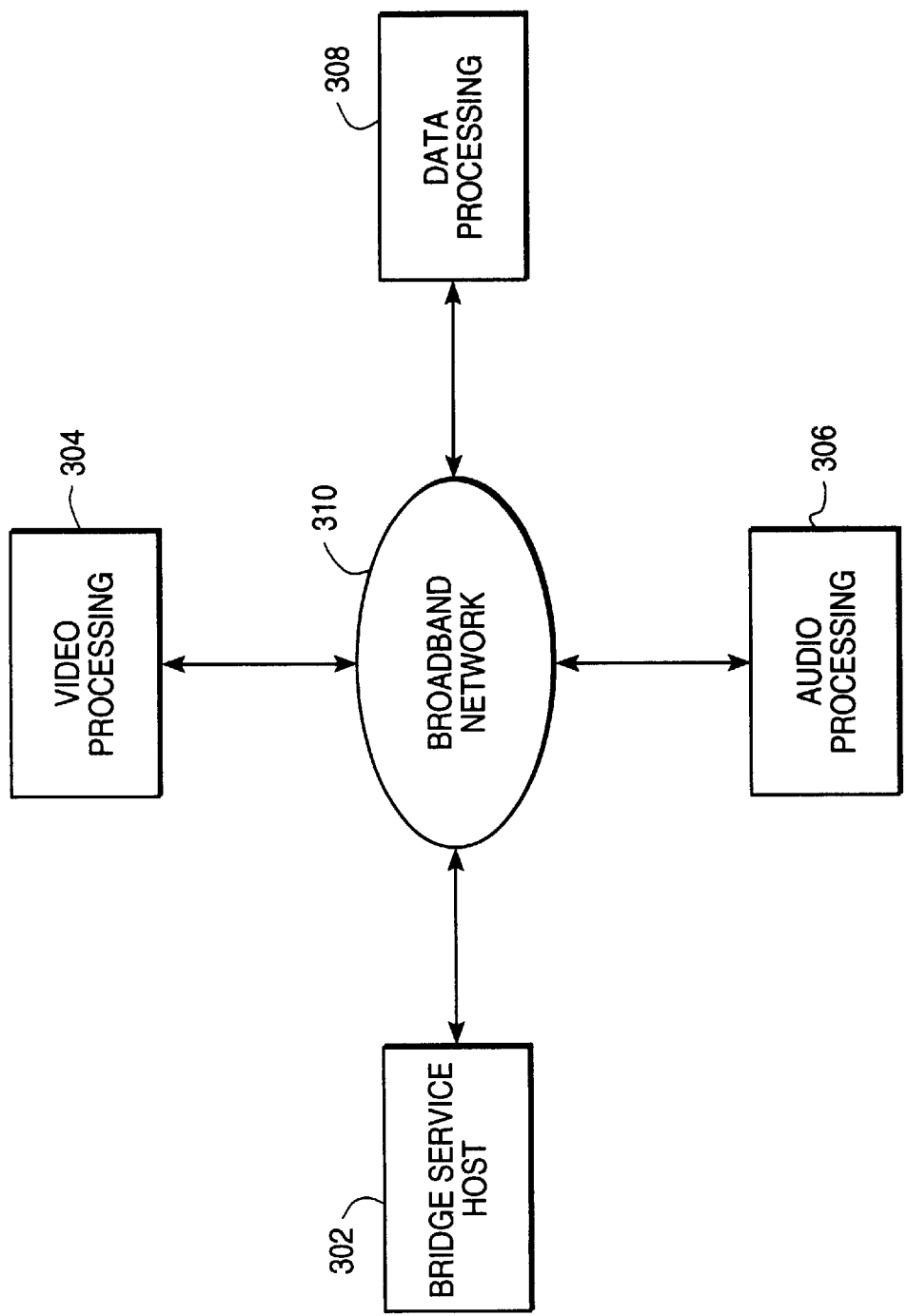
FIG. 3 is a flowchart detailing a process for interconnecting conference bridges in accordance with an embodiment of the invention.

In one embodiment, the conference bridge 212 is a computer system designed to handle large internal and external data bandwidth, such as available on modern class server machines. The conference bridge 212 can be physically realized using a collection of networked hosts offering in some embodiments, mediaspecific facilities such as video processing. Such a distributed bridge arrangement 300 is logically illustrated in FIG. 3 where a bridge service host 302, a video processing host 304, an audio processing host 306, and a data processing host 308 are interconnected by a broadband network 310.

Referring now to FIG. 4, a schematic block diagram of a communication group 400 in accordance with another embodiment, is shown. The group 400 is preferably an International Telecommunications Union (ITU)-Telephony Standardization Sector (TSS) compliant conferencing system. The group 400 includes a conference bridge 402 (e.g., multimedia conference bridge) that includes a selector unit 403 and that is coupled to network 204. It should be noted that the multimedia conference bridge 402 is one implementation of the conference bridge 212. In the described embodiment, the group 400 also has a LAN hub 406, and local clients "A", "B", "C", and "D", each being respectively associated with a personal conference system (PCS) 408–414. In the described embodiment, the selector circuit 403 is arranged to select, as desired, a dominant local client. It should be noted that any number (up to the number of available bridge ports) of local clients can be directly coupled to the bridge 402 (depending on the bridge's maximum number of ports) and that four are shown for this example for the four-port bridge.

The bridge 402 digitally interfaces with the PCSs 408–414 by way of the LAN hub 406. The operation and structure the LAN hub 106 are governed by IEEE 802. The PCSs 408–414 each include an audio-video interface to enable the operators to see and hear conferees and to be seen and heard by conferees. In the described embodiment, each of the PCSs 408–414 supports hardware and software required to enable an operator to appear in a videoconference. This includes video cameras, microphones, along with the required encoding, decoding, and communications software and hardware. The operator of any of the PCSs 408–414 can establish and connect to a videoconference using a graphical client interface (GUI) displayed on the respective PCS. A PCS may be, for example, a computer enabled for conferencing, or a videoconferencing telephone.

In a preferred embodiment, the group 400 supports ITU recommended standards. One such standard is referred to the H.323 protocol that covers multimedia over non-guaranteed bandwidth packet switched networks. The Internet and LANs using TCP/IP and SPX/IPX protocols running over Ethernet or Token Ring are examples of packet switched networks with non-guaranteed bandwidth. The H.323 protocol is a set of protocols that sits on top TCP/IP and provides interoperability among different vendors and platforms of products for multimedia communication applications that will run over LANs and the Internet. The H.323 standard specifies call control, multimedia management, and bandwidth management for point-to-point and multipoint conferences. H.323 also specifies protocols and elements that allow communication among LANs and other networks such as the PSTN.

In an audio-video conference, each conferee interfaces to the system 400 by a way of the respective PCS that contains a video coder/decoder (codec) board. Audio-video conferences are set up according to the codec capabilities of the participating conferees or according to a minimum codec capability determined to be in effect for the conference. The capabilities for the conference can be fixed or variable. If a conferee cannot meet the capabilities established for the conference, that conferee can attend the conference in an audio mode only or the bridge 402 can step down the capabilities to allow the conferee to join the conference, automatically or by command.

Still referring to FIG. 4, in order to set up an audio-video conference among local clients A, B, C, and D operating the PCSs 408, 410, 412, and 414, respectively, each of the clients calls into the bridge 402 using standard H.323 call setup commands. In one implementation of the invention, the bridge 402 then collects audio-only samples from each of the local clients A, B, C, D, and then quantizes each of the audio samples. By quantizing, it is meant that a pre-determined characteristic of the sample audio signal is evaluated. Such pre-determined characteristics include, for example, the maximum root mean square (RMS) amplitude for each of the audio samples. By using only audio samples, the necessity for the bridge 402 to perform resource intensive digital signal processing (such as that used to characterize video signals) is avoided.

Once all the audio samples from each of the clients A–D have been quantized, the bridge 402 then determines which of the local clients A–D is a dominant local client. Determination of dominance is based upon comparing each of the quantized samples from the local clients A–D against each other. The client whose quantized signal surpasses all other signals is then determined to be dominant. By way of example, if the RMS amplitude of the audio signal provided by the local client B is determined by the selector circuit 403 included in the bridge 412 to be greater than any of RMS amplitudes of the other local clients A, C, and D, then local client B is determined to be the dominant local client for the group 202a.

In much the same way as for group 202a, each of the bridges in groups 202b–202n connected to the network determines their own local dominant client using the same quantization algorithm. Once all bridges have determined their respective local dominant client using the same comparing algorithm, each bridge then sends a protocol element with the quantized signal associated with their respective local dominant client to all other bridges involved in the conference. Once each bridge has received all other quantized signals from all other bridges participating in the conference call, then each local bridge compares the received quantized signals of the non-local dominant clients with that of their local dominant client. The comparing operation results in determining an overall dominant client, which is duly instructed to send its signal, in either multicast or unicast form, to the other clients in embodiments where clients have such capability. In embodiments without this capability, the bridge having the overall dominant client as one of its local clients broadcasts to the other bridges the overall dominant client's signal for transmitting to those bridges' local clients.

In accordance with the present invention, each available port (and associated DSP resources) for each of the bridges can thus be utilized by a client to carry out the conference call, in contrast to the conventional approach of interconnecting bridges by way of individual ports dedicated to the bridge-to-bridge communication, thereby substantially improving the efficiency of utilizing bridge capacity.

Figure 5:
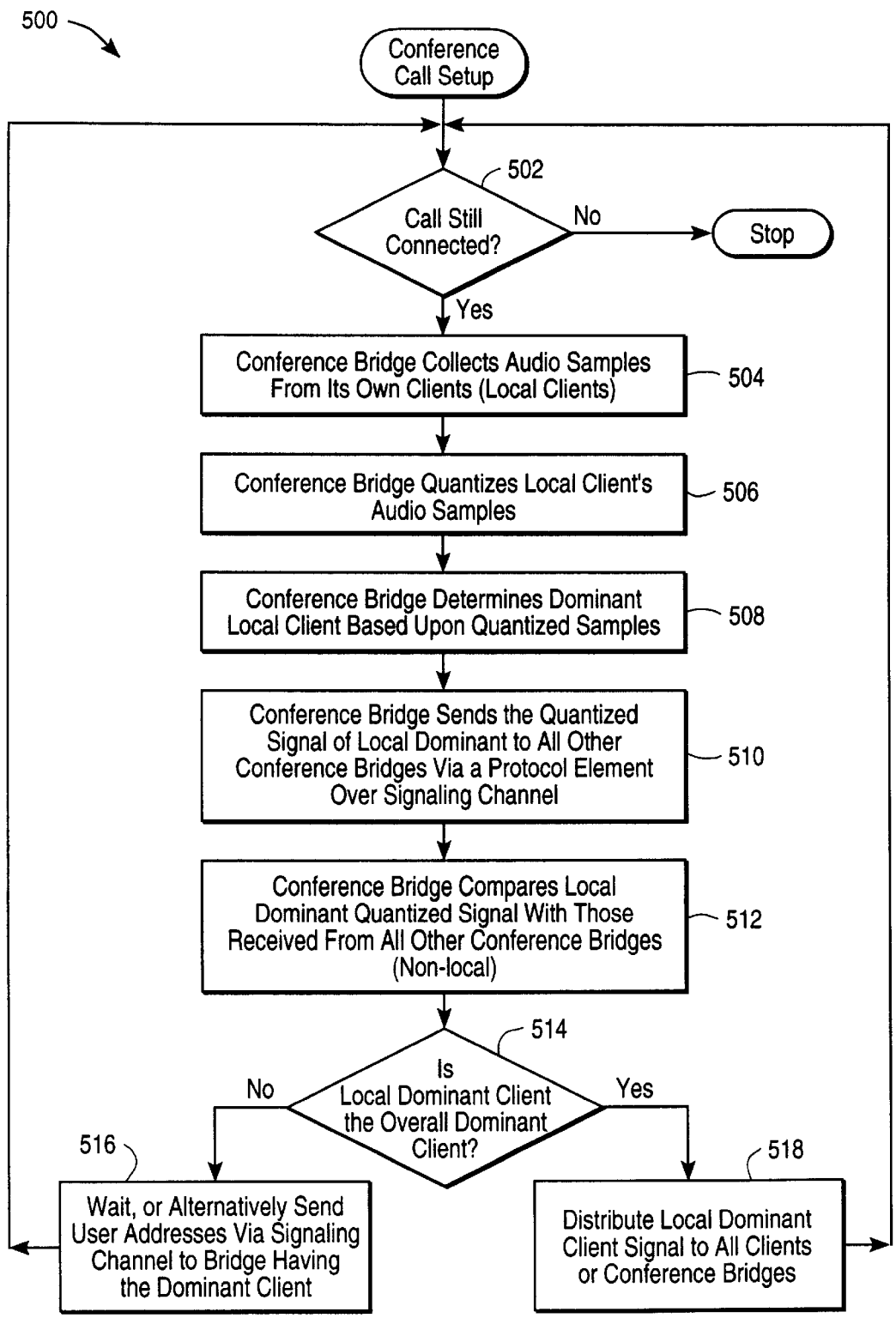
FIG. 5 is a flowchart detailing a process for establishing a conference in accordance with an embodiment of the invention.

FIG. 5 is a flowchart detailing a process 500 for establishing a conference in accordance with an embodiment of the invention. It should be noted that the process 500 is implemented, in one embodiment, in the network 200. The process 500 begins at step 502 by determining if the call is connected. If the call is not connected then the process stops. If the call is still connected, then the conference bridge for each client participating in the conference call collects audio samples from each of its respective local clients at step 504. Once all the audio samples from each local client are collected, each conference bridge then quantizes each sample according to a pre-determined algorithm at step 506. In one implementation, the audio sample is quantized based upon a pre-selected characteristic, such as wave amplitude, RMS amplitude, phase, etc.

Once all the audio samples have been appropriately quantized, each of the conference bridges determines which of the local clients is a dominant local client at step 508. In a specific embodiment, the determination of which of the local clients is the dominant local client may be done on the basis of which local client is sending the signal with the largest amplitude. Once the local dominant client is established by the bridge, each bridge in step 510 sends a protocol element indicating the preselected characteristic (in this example, the amplitude) of the audio signal of its local dominant client over the signaling channel to the other bridges. For example, the pre-selected characteristic sent in the protocol element could be the value "Y" of the amplitude of the local client sending the strongest signal. In contrast to the conventional approach discussed above where the interconnected bridges exchange respective local dominant audio streams, the present invention eliminates the otherwise inefficient exchange of audio streams between the bridges and instead transmits protocol elements via the signaling channel between the bridges. Therefore, the protocol elements are transmitted over the signaling channels on the LAN, but the DSP resources in the bridge's conference port (the port conventionally dedicated to bridge-to-bridge interconnection) are not tied up. Having received the protocol elements from the other bridges, each of the bridges can then compare in step 512 the various characteristics (amplitudes) in the received protocol elements. Each bridge thus determines in step 514 whether its local dominant client is the overall dominant client. The particular bridge logically connected to the local client that is determined in step 514 to be the overall dominant client in the conference then instructs in step 518 that overall dominant client to send its signal as a multicast or unicast signal to the other clients in the conference call (in alternative embodiments where the clients do not have such capability, the bridge having the overall dominant client in its local group sends the overall dominant client's signal to the other bridges for transmitting to their local clients); however, if the bridge is not logically connected to the overall dominant client, then that particular bridge does nothing but wait in step 516. The DSPs in the conference bridges thus listen to signals from the local clients and accordingly instruct the overall dominant user to send its signal in multicast or unicast to the other clients in some embodiments, and in the alternative embodiments the bridge having the overall dominant client may itself act as the source of the signal from the overall dominant client as discussed above. In other alternative embodiments, the other bridges in alternative step 516 can send to this dominant bridge via the signaling channels the Ethernet addresses of their users so that this dominant bridge can directly repeat the overall dominant signal, either in multicast or unicast form, to all other users in alternative step 518.

The process then returns to step 502 to determine if the conference call still connected. If the conference call is not connected, then the appropriate H.323 disconnect signals are sent and received, and the call is ended.

Figure 6:
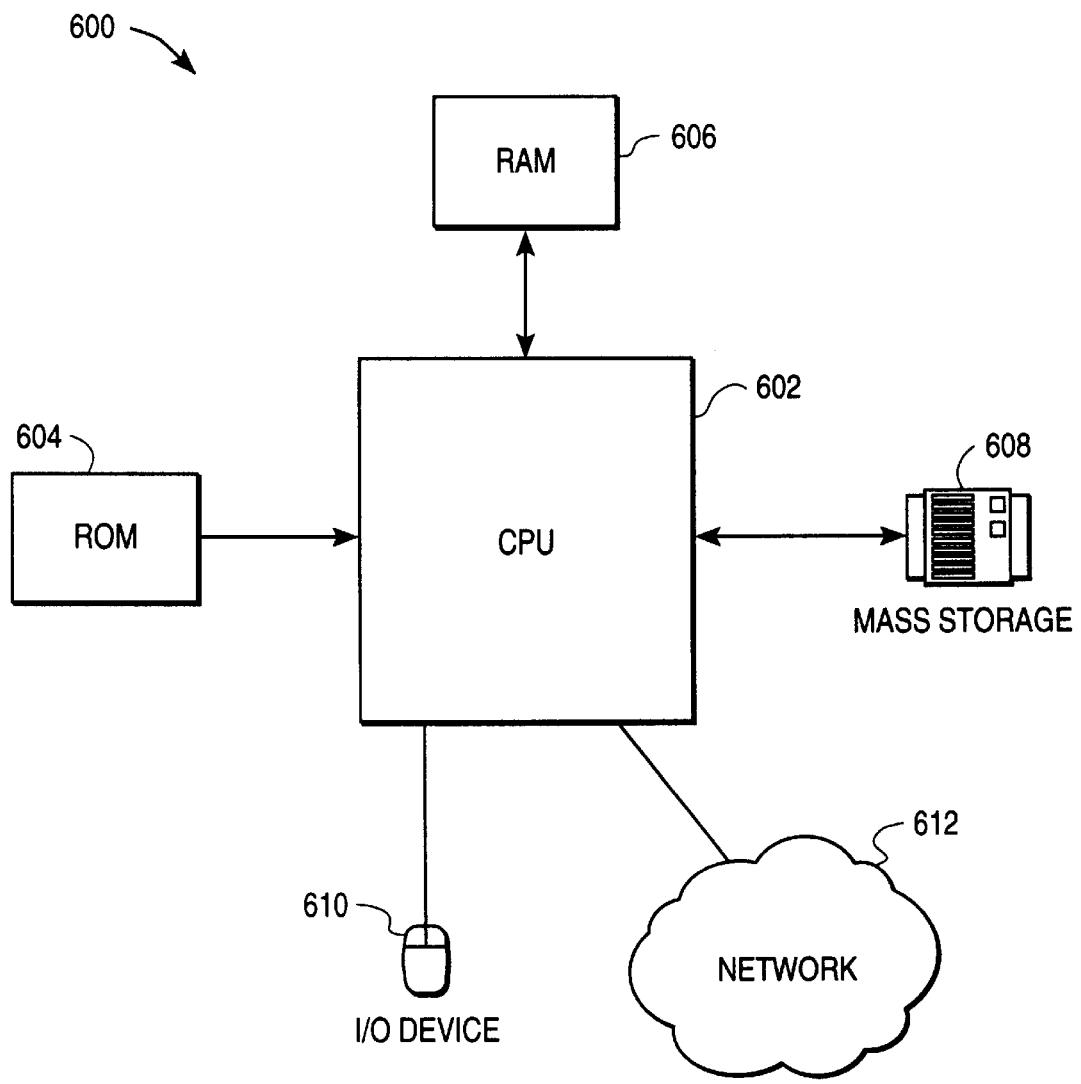
FIG. 6 illustrates a typical, general-purpose computer system suitable for implementing the present invention.

FIG. 6 illustrates a typical, general-purpose computer system 600 suitable for implementing the present invention in the form of a terminal or personal communications system. The computer system 600 includes any number of processors 602 (also referred to as central processing units, or CPUs) that are coupled to memory devices including primary storage devices 604 (typically a read-only memory, or ROM) and primary storage devices 606 (typically a random access memory, or RAM). Computer system 600 or, more specifically, CPUs 602, may be arranged to support a virtual machine, as will be appreciated by those skilled in the art. ROM acts to transfer data and instructions unidirectionally to the CPUs 602, while RAM is used typically to transfer data and instructions in a bidirectional manner. CPUs 602 may generally include any number of processors. Both primary storage devices 604, 606 may include any suitable computer-readable media. A secondary storage medium 608, which is typically a mass memory device, is also coupled bi-directionally to CPUs 602 and provides additional data storage capacity. The mass memory device 608 is a computer-readable medium that may be used to store programs including computer code, data, and the like. Typically, mass memory device 608 is a storage medium such as a hard disk or a tape which generally slower than primary storage devices 604, 606. Mass memory storage device 608 may take the form of a magnetic or paper tape reader or some other well-known device. Of course, the information retained within the mass memory device 608, may, in appropriate cases, be incorporated in standard fashion as part of RAM 606 as virtual memory. A specific primary storage device 604 such as a CD-ROM may also pass data uni-directionally to the CPUs 602.

CPUs 602 are also coupled to one or more input/output devices 610 that may include, but are not limited to, devices such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. CPUs 602 optionally may be coupled to a computer or telecommunications network, e.g., an Internet network or an intranet network, using a network connection as shown generally at 612. With such a network connection, it is contemplated that the CPUs 602 might receive information from the network, or might output information to the network in the course of performing the above-described method steps. Such information, which is often represented as a sequence of instructions to be executed using CPUs 602, may be received from and outputted to the network, for example, in the form of a computer data signal embodied in a carrier wave.

While the present invention has been described in the context of audio portion of multipoint conferencing for simplicity, it should be appreciated that the present invention may generally be implemented for any multipoint conferencing involving audio, video and multimedia signals.

What is claimed:

1. A method of establishing a multipoint conference among a plurality of communication units in a plurality of communication groups, each of said plurality of communication groups including a conference bridge and at least one communication unit associated with said conference bridge, a plurality of said conference bridges in said plurality of communication groups being arranged to establish communication for the multipoint conference, comprising:

determining the particular communication unit included within each of said plurality of communication groups that is a local dominant communication unit;

exchanging between said plurality of conference bridges a plurality of quantized values, each of said plurality of quantized values representative of the signal of the local dominant communication unit corresponding to each of said plurality of communication groups, determining based on comparisons of said plurality of quantized values which of the plurality of local dominant communication units is an overall dominant communication unit in said multipoint conference; and transmitting a signal of said overall dominant communication unit to all of said plurality of communication units in said multipoint conference.

2. A method as recited in claim 1, wherein said local dominant communication unit determining step comprises:

sampling the signal from each of the communication units within said each of said plurality of communication groups; and comparing the sampled signals from each of the communication units within each of said plurality of communication groups to determine said local dominant communication unit within each of said plurality of communication groups, wherein said sampling and comparing steps are performed by the conference bridge within each of said plurality of communication groups.

3. A method as recited in claim 2, wherein said sampling step comprises sampling the audio signal from each of the communication units within said each of said plurality of communication groups.

4. A method as recited in claim 1, wherein said plurality of quantized values are exchanged between said plurality of conference bridges via signaling channels between said plurality of conference bridges.

5. A method as recited in claim 4, wherein said signaling channels are over a local area network (LAN), intranet or Internet.

6. A method as recited in claim 4, wherein said signaling channels are over a wireless network.

7. A method as recited in claim 1, wherein said transmitting step comprises:
sending an instruction to said overall dominant communication unit to transmit said signal of said overall dominant communication unit directly to all of said plurality of communication units in said multipoint conference via a multicast transmission of said signal of said overall dominant communication unit, said signal comprising audio packets and video packets of said overall dominant communication unit.

8. A method as recited in claim 1 wherein said transmitting step comprises:
transmitting said signal of said overall dominant communication unit via said plurality of said conference bridges to all of their local communication units in said multipoint conference, said signal comprising audio packets and video packets of said overall dominant communication unit.

9. A method as recited in claim 1, wherein said transmitting step comprises:
sending to said conference bridge associated with said overall dominant communication unit the addresses of the local communication units from each of the others of said plurality of said conference bridges; and
transmitting said signal of said overall dominant communication unit directly to all of said plurality of communication units in said multipoint conference via a multicast transmission from said conference bridge associated with said overall dominant communication unit, said signal comprising audio packets and video packets of said overall dominant communication unit.

10. A method as recited in claim 1, wherein said multipoint conference comprises a multimedia conference, a videoconference, an audio conference, and/or a ToL conference.

11. A system for establishing a multipoint conference among a plurality of communication groups, wherein each communication group includes a conference bridge and a plurality of local communication units, comprising:
a plurality of conference bridges, each conference bridge logically coupled to a plurality of local communication units by way of a corresponding I/O port of said conference bridge, and wherein each conference bridge includes a selector unit configured to determine a dominant local communication unit among said plurality of local communication units in each of said plurality of communication groups, and wherein said plurality of conference bridges exchange a plurality of quantized signals to determine an overall dominant communication unit, each quantized signal representing the signal of a corresponding dominant local communication unit, and wherein a dominant signal of said overall dominant communication unit is transmitted to each of the plurality of communication groups.

12. A system as recited in claim 11, wherein each selector unit determines the dominant local communication unit by sampling the signal of each of its local communication units and comparing the sampled signals to determining the dominant local communication unit.

13. A system as recited in claim 12, wherein said signal is an audio signal and said dominant signal is formed of audio packets and video packets.

14. A system as recited in claim 11, wherein said dominant signal of said overall dominant communication unit is transmitted by said conference bridge associated with said overall dominant communication unit to each of the plurality of communication groups via their corresponding conference bridges.

15. A system as recited in claim 11, wherein said dominant signal of said overall dominant communication unit is transmitted by said conference bridge associated with said overall dominant communication unit directly to each local communication unit in said plurality of communication groups.

16. A system as recited in claim 15, wherein said conference bridge associated with said overall dominant communication unit receives address of each local communication unit from its corresponding conference bridge.

17. A system as recited in claim 11, wherein said dominant signal of said overall dominant communication unit is transmitted by said overall dominant communication unit upon instruction by said conference bridge associated with said overall dominant communication unit for receipt by each of said plurality of communication units.

18. A system as recited in claim 11, wherein said system comprises a conferencing system over a wireless network, a local area network, intranet or Internet.

19. A system as recited in claim 18, wherein said conferencing system comprises an audio conferencing system, a video conferencing system, or a multimedia conferencing system.

20. A computer program product comprising:
a computer readable medium;
multimedia conference bridge operating instructions embedded in the computer readable medium, wherein the multimedia conference bridge operating instructions determine which one of a plurality of communication units is a dominant local communication unit and transmit a quantized signal representing said dominant local communication unit, and wherein the multimedia conference bridge operating instructions compare quantized signals of dominant local communication units received from other bridges to determine an overall dominant communication unit which in turn broadcasts an associated communication signal to other communication units coupled thereto.

21. A method as recited in claim 1, wherein each of said plurality of conference bridges includes a limited number of conferencing ports, and interconnecting two of said plurality of conference bridges does not occupy any conferencing ports of said two of said plurality of conference bridges.

22. A system as recited in claim 11, wherein each of said plurality of conference bridges includes a limited number of conferencing ports, and interconnecting two of said plurality of conference bridges does not occupy any conferencing ports of said two of said plurality of conference bridges.

* * * * *